(12) United States Patent
Pan

(10) Patent No.: US 11,789,353 B2
(45) Date of Patent: Oct. 17, 2023

(54) ILLUMINATION SYSTEM AND PROJECTION DEVICE

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/527,093

(22) Filed: Nov. 15, 2021

(65) Prior Publication Data

US 2022/0171276 A1 Jun. 2, 2022

(30) Foreign Application Priority Data

Nov. 27, 2020 (CN) .......................... 202011360626.5

(51) Int. Cl.
*G03B 33/08* (2006.01)
*G03B 21/20* (2006.01)
*G02B 27/14* (2006.01)

(52) U.S. Cl.
CPC ........... *G03B 33/08* (2013.01); *G02B 27/141* (2013.01); *G03B 21/204* (2013.01); *G03B 21/2053* (2013.01)

(58) Field of Classification Search
CPC .. G03B 33/08; G03B 21/204; G03B 21/2053; G03B 21/2013; G03B 21/2066; G02B 27/141; G02B 26/008
See application file for complete search history.

(56) References Cited

U.S. PATENT DOCUMENTS

| 2015/0316775 | A1  | 11/2015 | Hsieh et al. |
| 2018/0129126 | A1* | 5/2018  | Liao .................... G02B 26/008 |
| 2018/0157028 | A1* | 6/2018  | Liao .................... G02B 27/141 |
| 2018/0164667 | A1* | 6/2018  | Wang .................. G02B 26/00 |

(Continued)

FOREIGN PATENT DOCUMENTS

| CN | 101878652 | 11/2010 |
| CN | 104765240 | 7/2015 |

(Continued)

OTHER PUBLICATIONS

"Office Action of China Counterpart Application", dated Jan. 20, 2023, p. 1-p. 18.

*Primary Examiner* — Magda Cruz
(74) *Attorney, Agent, or Firm* — JCIPRNET

(57) ABSTRACT

An illumination system and a projection device using the same are provided. The illumination system provides an illumination light beam and includes a blue light source, a red light source, a wavelength conversion device, a first light splitting element, a filter device, and a light uniformizing element. The blue light source provides a blue excitation light beam. The red light source provides a red light beam. The wavelength conversion device converts the blue excitation light beam into an excited light beam. The filter device includes a filter region. The blue excitation light beam, the excited light beam and the red light beam are sequentially transmitted to the filter device and the light uniformizing element to form the illumination light beam, wherein the excited light beam and the red light beam pass through the filter region in different time interval.

18 Claims, 11 Drawing Sheets

(56) References Cited

U.S. PATENT DOCUMENTS

| | | | | |
|---|---|---|---|---|
| 2018/0343425 A1* | 11/2018 | Liao | .................... | H04N 9/3158 |
| 2019/0331997 A1* | 10/2019 | Pan | .................... | G03B 21/208 |
| 2019/0353995 A1* | 11/2019 | Pan | .................... | H04N 9/3155 |
| 2020/0050093 A1 | 2/2020 | Liao et al. | | |
| 2020/0319542 A1 | 10/2020 | Pan | | |

FOREIGN PATENT DOCUMENTS

| | | |
|---|---|---|
| CN | 108073021 | 5/2018 |
| CN | 108227353 | 6/2018 |
| CN | 209765253 | 12/2019 |
| CN | 111025833 | 4/2020 |
| CN | 111757071 | 10/2020 |
| CN | 211741818 | 10/2020 |
| TW | I621905 | 4/2018 |

\* cited by examiner

ILLUMINATION SYSTEM AND PROJECTION DEVICE

CROSS-REFERENCE TO RELATED APPLICATION

This application claims the priority benefit of China application serial no. 202011360626.5, filed on Nov. 27, 2020. The entirety of the above-mentioned patent application is hereby incorporated by reference herein and made a part of this specification.

BACKGROUND

Technical Field

The invention relates to an optical system and an electronic device, and particularly relates to an illumination system and a projection device.

Description of Related Art

Projection device is a display device used to generate large-size images, and has been continuously improved along with evolution and innovation of technology. An imaging principle of the projection device is to convert an illumination light beam generated by an illumination system into an image light beam through a light valve, and then project the image light beam onto a projection target (such as a screen or a wall) through a projection lens to form a projection image.

In addition, along with market's requirements on brightness, color saturation, service life, non-toxic and environmental protection of projection devices, the illumination system has evolved from ultra-high-performance lamps (UHP lamps), light-emitting diodes (LED) to the most advanced laser diode (LD) light sources. In a current optical system, since a current high-brightness green laser diode has not yet reached a reasonable price for projector applications, a main method currently used is to use a blue laser diode light source to excite phosphor on a phosphor color wheel to produce yellow-green light, and then use a color filter color wheel to filter out the required red/green light, and in collaboration with blue light generated by the blue laser diode, three primary colors of red, green and blue required by a projection image is produced. However, since a light spot incident on the phosphor color wheel has a certain area, when the phosphor color wheel rotates rapidly, the light spot may simultaneously irradiate junctions of different regions of the phosphor color wheel in a specific period of time, so that the light incident to an integrating rod is mixed color light. During this period of time, the light incident to a light valve is unstable mixed color light. At this time, a micro lens array of the light valve presents a turn-off state, and a black image is projected on a screen through the lens to avoid producing an image color difference. Therefore, the biggest impact on the projection system is the loss of brightness caused by the light valve in the turn-off state.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an illumination system and a projection device, where unstable mixed color light is prevented from being incident to a light valve, thereby improving usage efficiency of the light valve to increase a projection brightness of the projection device.

Other objects and advantages of the invention may be further illustrated by the technical features broadly embodied and described as follows.

In order to achieve one or a portion of or all of the objects or other objects, an embodiment of the invention provides an illumination system, configured to provide an illumination light beam. The illumination system includes a blue light source, a red light source, a wavelength conversion device, a first light splitting element, a filter device and a light uniformizing element. The blue light source is configured to provide a blue excitation light beam. The red light source is configured to provide a red light beam. The wavelength conversion device is disposed on a transmission path of the blue excitation light beam for converting the blue excitation light beam into an excited light beam. The first light splitting element is disposed on a transmission path of the blue excitation light beam and the excited light beam, and is configured to allow one of the blue excitation light beam and the excited light beam to pass through and reflect the other. The filter device is disposed on a transmission path of the red light beam, the blue excitation light beam and the excited light beam and includes a filter region. The filter device is located between the first light splitting element and the light uniformizing element, and the blue excitation light beam, the excited light beam and the red light beam are sequentially transmitted to the filter device and the light uniformizing element to form the illumination light beam, wherein the excited light beam and the red light beam pass through the filter region in different time interval.

In order to achieve one or a portion of or all of the objects or other objects, an embodiment of the invention provides a projection device including an illumination system, a light valve and a projection lens. The illumination system is configured to provide an illumination light beam. The illumination system includes a blue light source, a red light source, a wavelength conversion device, a first light splitting element, a filter device and a light uniformizing element. The blue light source is configured to provide a blue excitation light beam. The red light source is configured to provide a red light beam. The wavelength conversion device is disposed on a transmission path of the blue excitation light beam for converting the blue excitation light beam into an excited light beam. The first light splitting element is disposed on a transmission path of the blue excitation light beam and the excited light beam, and is configured to allow one of the blue excitation light beam and the excited light beam to pass through and reflect the other. The filter device is disposed on a transmission path of the red light beam, the blue excitation light beam and the excited light beam and includes a filter region. The filter device is located between the first light splitting element and the light uniformizing element, and the blue excitation light beam, the excited light beam and the red light beam are sequentially transmitted to the filter device and the light uniformizing element to form the illumination light beam, wherein the excited light beam and the red light beam pass through the filter region in different time interval. The light valve is disposed on a transmission path of the illumination light beam, and configured to convert the illumination light beam into an image light beam. The projection lens is disposed on a transmission path of the image light beam, and configured to project the image beam out of the projection device.

Based on the above description, the embodiments of the invention have at least one of following advantages or effects. In the illumination system and the projection device of the invention, the blue light source provides the blue excitation light beam, the red light source provides the red light beam, the blue excitation light beam is converted into the excited light beam by the wavelength conversion device, and the red light beam passes through junctions of different regions (such as a light-transmitting region, a filter region and a diffusion region) of the filter device in different time interval, where the excited light beam and the red light beam pass through the filter region of the filter device in different time interval. Therefore, a situation that the excited light beam or the blue excitation light beam is transmitted to the junctions of different regions of the filter device to generate unstable mixed color light is avoided. In this way, the light beam entering the light valve is avoided to be unstable mixed-color light, thereby improving the usage efficiency of the light valve to increase the projection brightness of the projection device.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
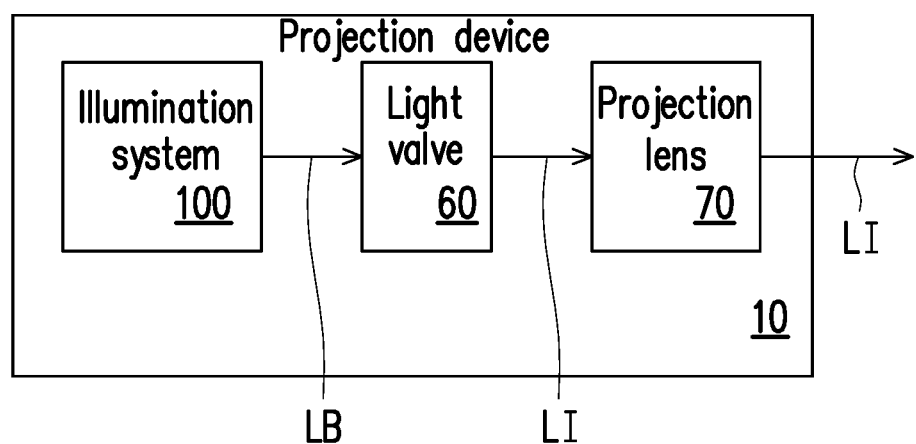
FIG. 1 is a schematic diagram of a projection device according to an embodiment of the invention.

FIG. 1 is a schematic diagram of a projection device according to an embodiment of the invention. Referring to FIG. 1, the embodiment provides a projection device 10 including an illumination system 100, at least one light valve 60 and a projection lens 70. The illumination system 100 is configured to provide an illumination light beam LB. The at least one light valve 60 is disposed on a transmission path of the illumination light beam LB for converting the illumination light beam LB into an image light beam LI. The projection lens 70 is disposed on a transmission path of the image light beam LI, and is configured to project the image light beam LI out of the projection device 10 to a projection target (not shown), such as a screen or a wall.

The illumination system 100 is configured to provide the illumination light beam LB. For example, the illumination system 100 is composed of one or a plurality of light-emitting elements, a wavelength conversion device, a light uniformizing element, a filter device, and/or a light splitting element to provide light beams of different wavelengths to serve as a source of the image light beam. However, the invention does not limit the type or form of the illumination system 100 in the projection device 10, and sufficient instruction, suggestion and implementation description for a detailed structure and implementation of the illumination system 100 may be learned from the following description.

In the embodiment, the light valve 60 is, for example, a reflective light modulator such as a liquid crystal on silicon panel (LCoS panel), a digital micro-mirror device (DMD), etc. In some embodiments, the light valve 60 may also be a transmissive light modulator such as a transparent liquid crystal panel, an electro-optical modulator, a magneto-optic modulator, or an acousto-optic modulator (AOM), etc. The pattern and type of the light valve 60 are not limited by the invention. Detailed steps and implementations of the method that the light valve 60 converts the illuminating light beam LB into the image light beam LI may be obtained from general knowledge in the technical field with sufficient teachings, suggestions and implementation descriptions, which will not be repeated. In the embodiment, a number of the light valve 60 is one, for example, the projection device 10 uses a single digital micro-mirror device, but in other embodiments, the number of the light valves 60 may be multiple, which is not limited by the invention.

The projection lens 70 includes, for example, a combination of one or more optical lenses having refractive powers, for example, various combinations of non-planar lenses such as a biconcave lens, a biconvex lens, a concavo-convex lens, a convexo-concave lens, a plano-convex lens, a plano-concave lens, etc. In an embodiment, the projection lens 70 may further include a planar optical lens to project the image light beam LI coming from the light valve 60 to the projection target in a reflective manner. The pattern and type of the projection lens 70 are not limited by the invention.

Figure 2:
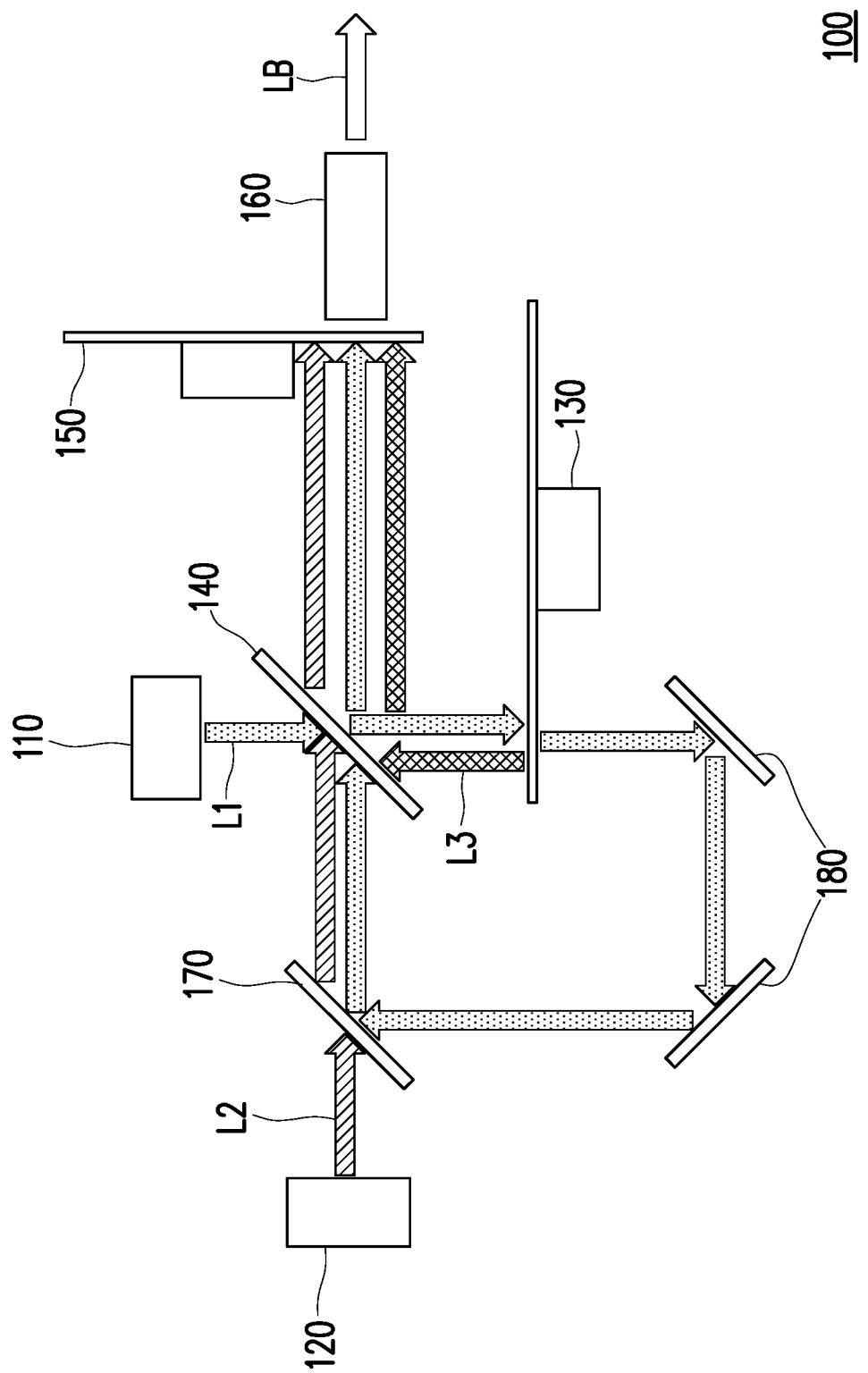
FIG. 2 is a schematic diagram of an illumination system according to an embodiment of the invention.

FIG. 2 is a schematic diagram of an illumination system according to an embodiment of the invention. Referring to FIG. 1 and FIG. 2 at the same time, in the embodiment, the illumination system 100 includes a blue light source 110, a red light source 120, a wavelength conversion device 130, a first light splitting element 140, a filter device 150, and a light uniformizing element 160. The blue light source 110 is configured to provide a blue excitation light beam L1, and the red light source 120 is configured to provide a red light beam L2. In detail, the blue light source 110 of the embodiment is a blue laser diode or a blue laser diode array, and a peak wavelength of the blue excitation light beam L1 is 455 nm. The red light source 120 of the embodiment is a red laser diode, and a peak wavelength of the red light beam L2 is 638 nm, but the invention is not limited thereto.

Figure 3:
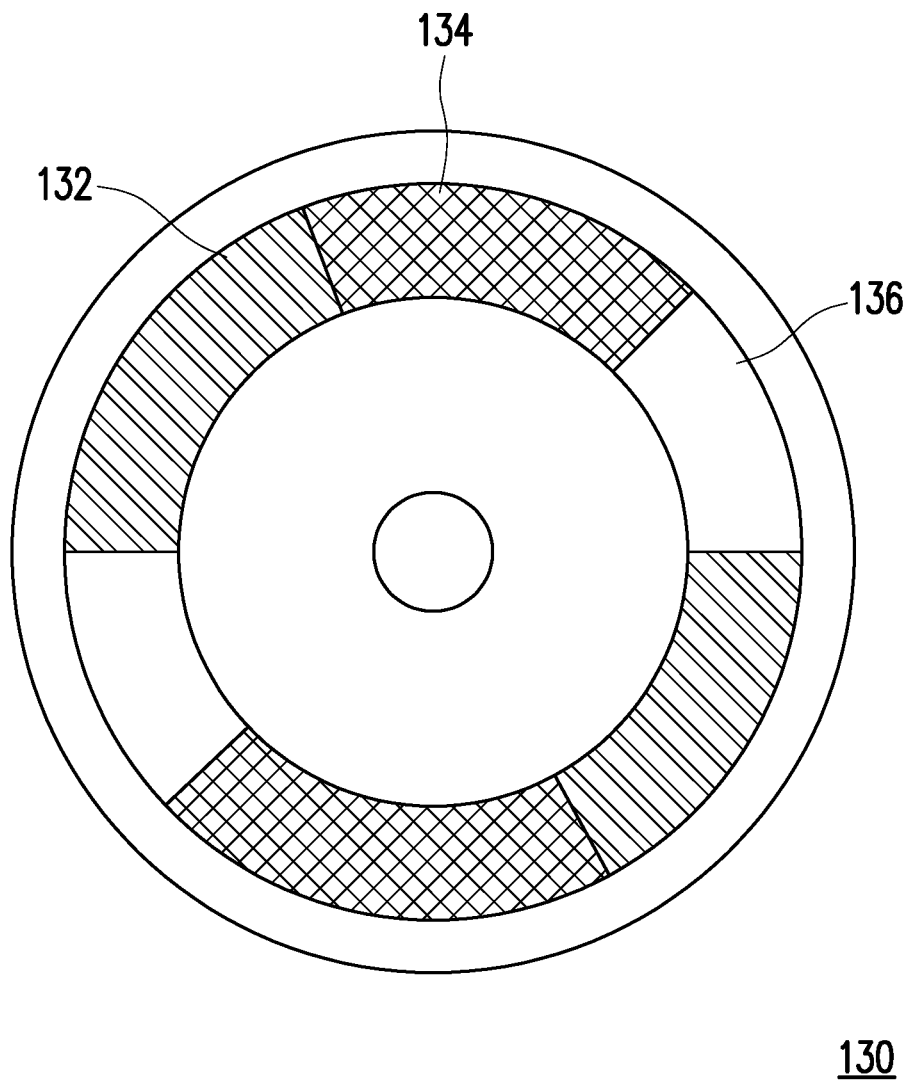
FIG. 3 is a schematic diagram of a wavelength conversion device of the illumination system of FIG. 2.

FIG. 3 is a schematic diagram of a wavelength conversion device of the illumination system of FIG. 2. Referring to FIG. 2 and FIG. 3, the wavelength conversion device 130 is disposed on a transmission path of the blue excitation light beam L1, and is configured to convert the blue excitation light beam L1 coming from the blue light source 110 into an excited light beam L3. The wavelength conversion device 130 has yellow and green light wavelength conversion materials (for example, a phosphor material), where the wavelength conversion materials are used to convert the blue excitation light beam L1 into the yellow-green excited light beam L3. Namely, the excited light beam L3 includes a yellow light beam and a yellow-green light beam, but the invention is not limited thereto. In detail, in the embodiment, the wavelength conversion device 130 includes a yellow light conversion region 132, a yellow-green light conversion region 134, and a light-transmitting region 136. The light-transmitting region 136 is, for example, a transparent glass or a hollow region.

Referring to FIG. 2, the first light splitting element 140 is disposed on a transmission path of the blue excitation light beam L1 and the excited light beam L3, and is configured to allow one of the blue excitation light beam L1 and the excited light beam L3 to pass through and reflect the other. In the embodiment, the first light splitting element 140 is, for example, a dichroic mirror with green and orange reflect (DMGO), which allows the blue excitation light beam L1 and the red light beam L2 to pass through and reflect the excited light beam L2. However, in other embodiments, different types of light splitters may be used, which is not limited by the invention.

Figure 4:
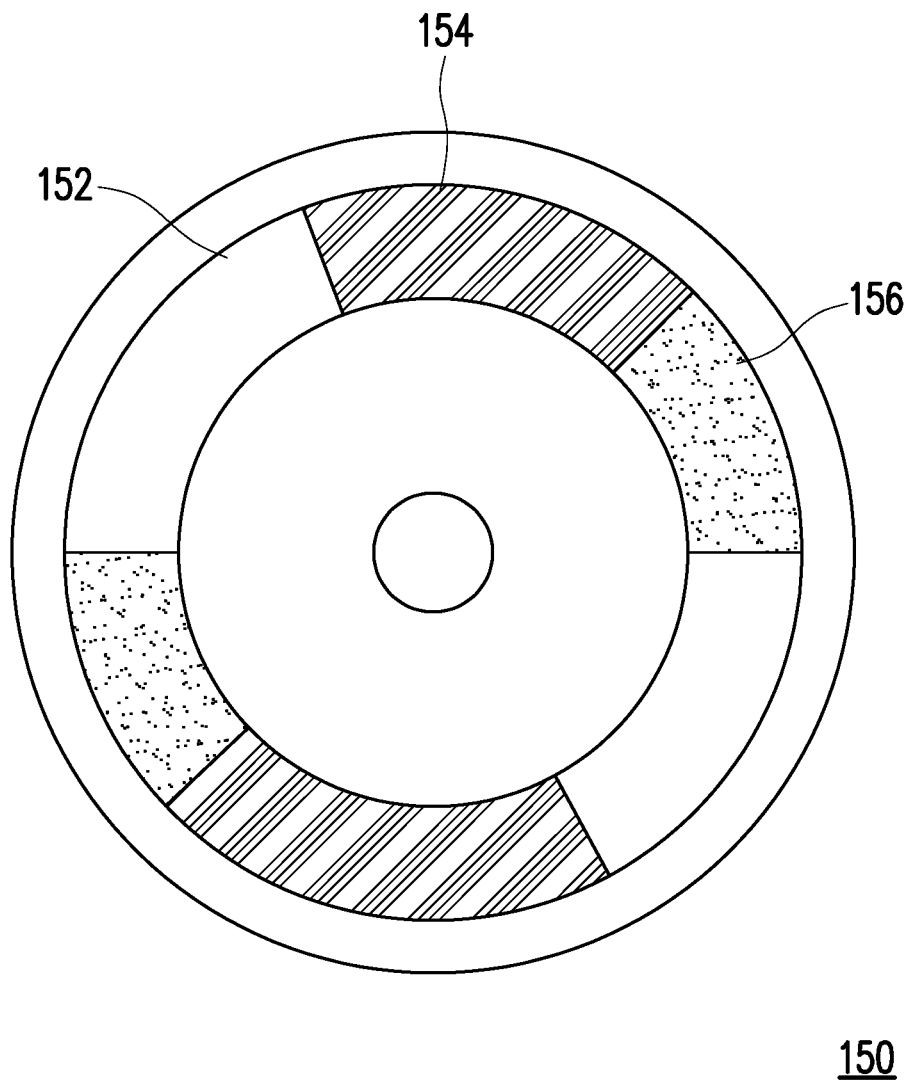
FIG. 4 is a schematic diagram of a filter device of the illumination system of FIG. 2.
Figure 5A:
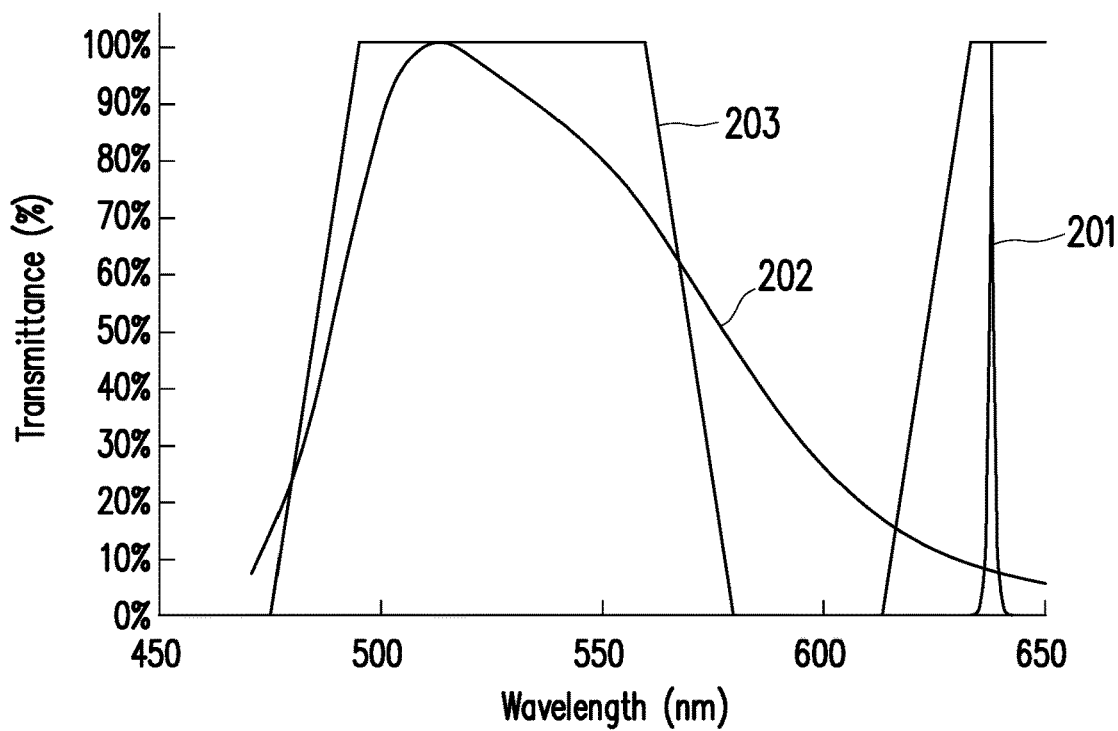
FIG. 5A and FIG. 5B are respectively schematic diagrams of optical effects of a filter region in the filter device of FIG. 2.
Figure 5B:
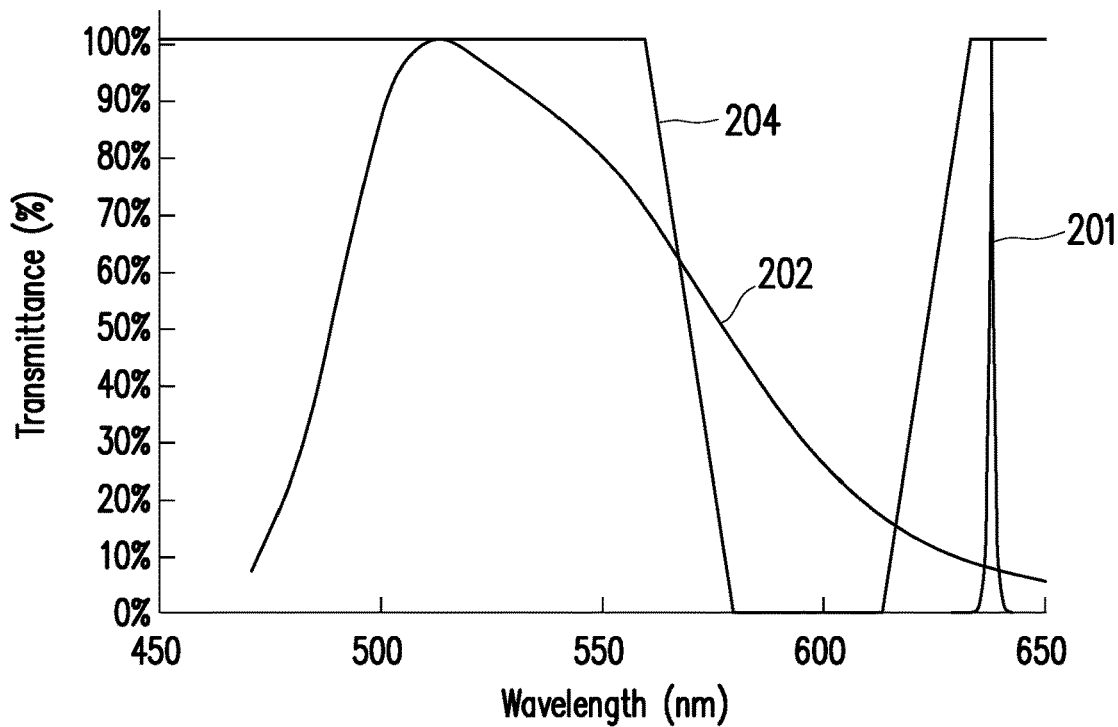

FIG. 4 is a schematic diagram of the filter device of the illumination system of FIG. 2. FIG. 5A and FIG. 5B are respectively schematic diagrams of optical effects of a filter region in the filter device of FIG. 2. Referring to FIG. 2, FIG. 4 and FIG. 5A at the same time, the filter device 150 is disposed on a transmission path of the red light beam L2, the blue excitation light beam L1 and the excited light beam L3 and includes a filter region. In detail, in the embodiment, the light filter device 150 includes a light-transmitting region 152, a filter region 154, and a diffusion region 156. The light-transmitting region 152 is, for example, transparent glass for allowing light beams to pass through. The filter region 154 has a filter coating for allowing light beams of a specific waveband to pass through. The diffusion region 156 is used to diffuse the passing light beams. In FIG. 5A, a line segment 201 is a waveband of the red light beam L2 and transmittances corresponding to the filter region 154, a line segment 202 is a waveband of the excited light beam L3 and transmittances corresponding to the filter region 154, and a line segment 203 is a waveband of all light beams and transmittances corresponding to the filter region 154. In the embodiment, the coating of the filter region 154 allows the light beams in a waveband of 470 nm to 580 nm and above 620 nm to pass through, so that the filter region 154 may allow the light beam of the green waveband in the excited light beam L3 and the red light beam L2 to pass through, as shown in FIG. 5B. In a different embodiment, the coating of the filter region may also be designed to allow light beams with a waveband below 580 nm and above 620 nm to pass through, for example, a line segment 204 shown in FIG. 5B is a waveband of all light beams and transmittances corresponding to the filter region 154, but the invention is not limited thereto. In the embodiment, a yellow light beam in the excited light beam L3 passes through the light-transmitting region 152, and a yellow-green light beam in the excited light beam L3 passes through the filter region 154.

Referring to FIG. 2, the light uniformizing element 160 is disposed on a transmission path of the light beams passing through the filter device 150. Namely, the filter device 150 is located between the first light splitting element 140 and the light uniformizing element 160. The light uniformizing element 160 is disposed on the transmission path of the light beams passing through the filter device 150, and is configured to adjust a light spot shape of these light beams, so that a shape of a light spot of the formed illumination light beam LB may match a shape (for example: a rectangle) of an effective working area of the light valve 60, and the light spot may have the same or close light intensity everywhere, which uniforms the light intensity of the illumination light beam LB. In the embodiment, the light uniformizing element 160 is, for example, an integrating rod, but in other embodiments, the light uniformizing element 160 may also be other suitable types of optical elements, such as a fly eye lens array, which is not limited by the invention.

In the embodiment, the illumination system 100 further includes a second light splitting element 170, which is disposed on the transmission path of the red light beam L2 and the blue excitation light beam L1, and is configured to allow the red light beam L2 to pass through and reflect the blue excitation light beam L1. In the embodiment, the second light splitting element 170 is, for example, a dichroic mirror with blue reflect (DMB). However, in other embodiments, different types of light splitters may be used, which is not limited by the invention.

Besides, in the embodiment, the illumination system 100 may further include mirrors 180. The mirrors 180 are configured to guide the transmission path of the blue excitation light beam L1 in the system, so that the blue excitation light beam L1 is transmitted to the light uniformizing element 160. However, the invention is not limited thereto, and in other embodiments, other types of optical elements may be used to guide the blue excitation light beam L1 to the light uniformizing element 160.

Figure 6:
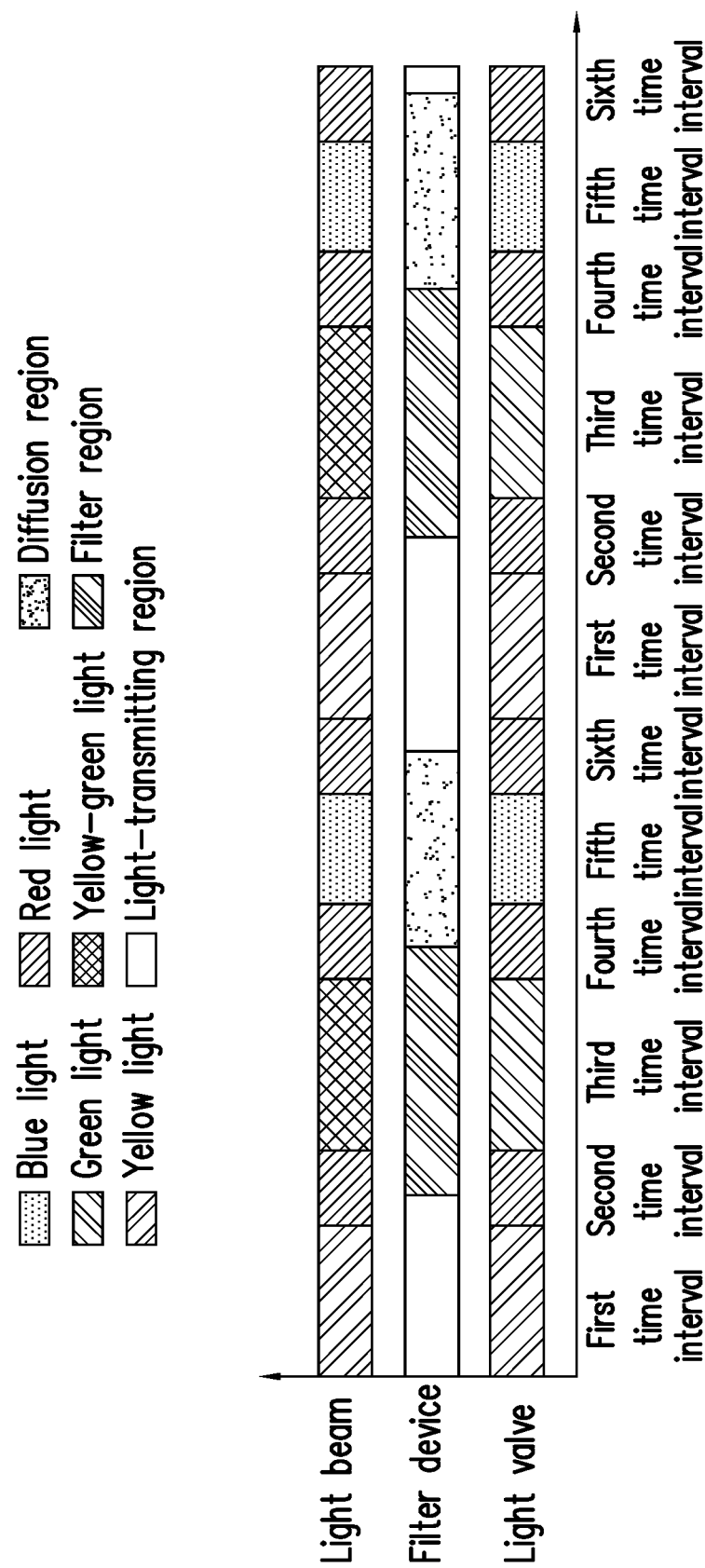
FIG. 6 is a time-interval schematic diagram of the illumination system of FIG. 2.

FIG. 6 is a time-interval schematic diagram of the illumination system of FIG. 2. Referring to FIG. 1 to FIG. 4 and FIG. 6 at the same time, in the embodiment, the illumination system 100 has a first time interval to a sixth time interval. In detail, at the first time interval, the blue light source 110 is turned on and the red light source 120 is turned off, and the blue excitation light beam L1 is transmitted to the yellow light conversion region 132 of the wavelength conversion device 130 through the first light splitting element 140, so that the blue excitation light beam L1 is converted into the excited light beam L3 of a yellow color. The excited light beam L3 is reflected by the first light splitting element 140 and transmitted to the light-transmitting region 152 of the filter device 150, and is then transmitted to the light uniformizing element 160, so that the light valve 60 receives a yellow light beam. At the second time interval, the red light source 120 is turned on and the blue light source 110 is turned off, and the red light beam L2 sequentially passes through the second light splitting element 170, the first light splitting element 140, and the filter device 150 to enter the light uniformizing element 160, so that the light valve 60 receives a red light beam.

At the third time interval, the blue light source 110 is turned on and the red light source 120 is turned off. The blue excitation light beam L1 is transmitted to the yellow-green light conversion region 134 of the wavelength conversion device 130 by the first light splitting element 140 to obtain the excited light beam L3 of a yellow-green color. The excited light beam L3 is reflected by the first light splitting element 140 and transmitted to the filter region 154 of the filter device 150, and is then transmitted into the light uniformizing element 160, so that the light valve 60 receives a green light beam. At the fourth time interval, the red light source 120 is turned on and the blue light source 110 is turned off, and the red light beam L2 sequentially passes through the second light splitting element 170, the first light splitting element 140, and the filter device 150 to enter the light uniformizing element 160, so that the light valve 60 receives the red light beam.

At the fifth time interval, the blue light source 110 is turned on and the red light source 120 is turned off, and the blue excitation light beam L1 is transmitted to the light-transmitting region 136 of the wavelength conversion device 130 through the first light splitting element 140 to pass through the light-transmitting region 136, and is then sequentially reflected by the mirrors 180 and the second light splitting element 170 to pass through the first light splitting element 140 and the diffusion region 156 of the filter device 150 to enter the light uniformizing element 160, so that the light valve 60 receives a blue light beam. At the sixth time interval, the red light source 120 is turned on and the blue light source 110 is turned off, and the red light beam L2 sequentially passes through the second light splitting element 170, the first light splitting element 140, and the filter device 150 to enter the light uniformizing element 160, so that the light valve 60 receives the red light beam.

It should be noted that in the embodiment, at the second, fourth, and sixth time intervals, an order that the red light beam L2 is transmitted to the filter device 150 is the junctions of the light-transmitting region 152, the filter region 154 and the diffusion region 156. In detail, one end of the light-transmitting region 152 and one end of the filter region 154 in the filter device 150 are adjacent to each other and are a first connection region, and the other end of the filter region 154 and one end of the diffusion region 156 are adjacent to each other and are a second connection region, and the other end of the diffusion region 156 and the other end of the light-transmitting region 152 are adjacent to each other and are a third connection region. Therefore, at the second time interval, the red light beam L2 passes through the first connection region of the filter device 150. At the fourth time interval, the red light beam L2 passes through the second connection region of the filter device 150. At the sixth time interval, the red light beam L2 passes through the third connection region of the filter device 150, i.e., the red light beam L2 may pass through the light-transmitting region 152, the filter region 154, and the diffusion region 156 of the filter device 150. In other words, in the embodiment, by turning off the blue light source 110 when the connection regions correspond to the transmission path of the light beam, the excited light beam L3 (the yellow light, the yellow-green light) or the blue excitation light beam L1 may be prevented from being transmitted to the connection regions, thereby preventing generation of unstable mixed color light to cause close of the light valve 60 in the above time intervals. In this way, the light incident to the light valve 60 is avoided to be unstable mixed-color light, thereby improving the usage efficiency of the light valve 60 to increase the projection brightness of the projection device 10.

Figure 7:
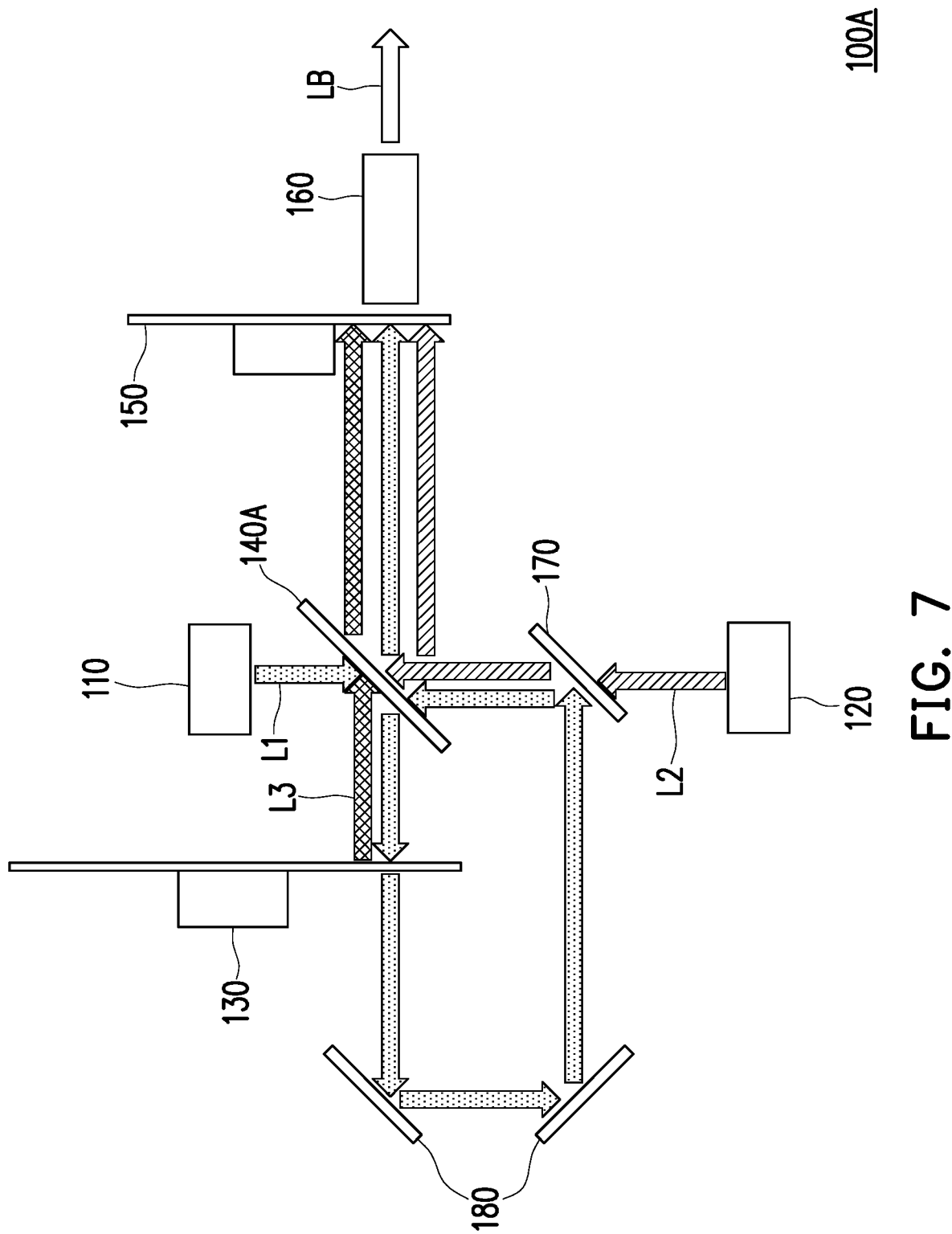
FIG. 7 is a schematic diagram of an illumination system according to another embodiment of the invention.

FIG. 7 is a schematic diagram of an illumination system according to another embodiment of the invention. Referring to FIG. 7, an illumination system 100A of the embodiment is similar to the illumination system 100 shown in FIG. 2. A difference there between is that, in the embodiment, the first light splitting element 140A is a dichroic mirror with blue and red reflect (DMBR). In other words, in the embodiment, the blue excitation light beam L1 may also be first reflected by the first light splitting element 140A, and the reflected blue excitation light beam L1 is converted by the yellow light conversion region 132 and the yellow-green light conversion region 134 of the wavelength conversion device 130 to correspondingly generate the yellow light beam and the yellow-green light beam to penetrate through the first light splitting element 140A. In this way, the light incident to the light valve is avoided to be the unstable mixed color light, thereby improving the usage efficiency of the light valve to increase the projection brightness of the projection device.

Figure 8:
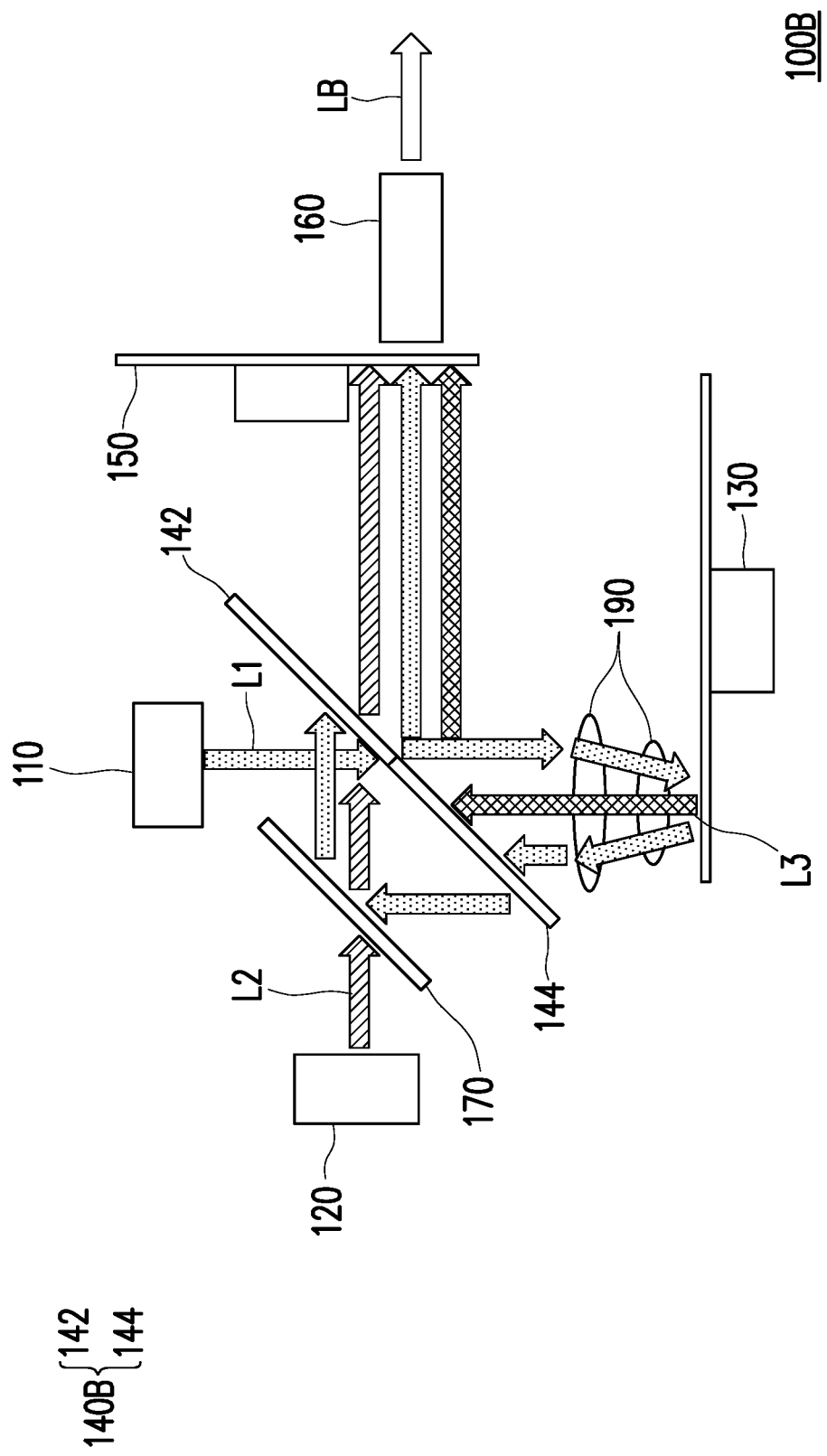
FIG. 8 is a schematic diagram of an illumination system according to another embodiment of the invention.

FIG. 8 is a schematic diagram of an illumination system according to another embodiment of the invention. Referring to FIG. 8, an illumination system 100B of the embodiment is similar to the illumination system 100 shown in FIG. 2. A difference there between is that, in the embodiment, the first light splitting element 140B includes a first part 142 and a second part 144. The first part 142 is, for example, a reflective dichroic mirror with green and orange reflect (DMGO), and the second part 144 is, for example, a transflective blue light DMGO. In addition, the illumination system 100B includes a focusing lens group 190, which is disposed between the first light splitting element 140B and the wavelength conversion device 130. In addition, the light-transmitting region of the wavelength conversion device 130 of the embodiment is replaced by a reflective region (not shown). In this way, the light incident to the light valve is avoided to be the unstable mixed color light, thereby improving the usage efficiency of the light valve to increase the projection brightness of the projection device.

Therefore, at the first time interval, the third time interval, and the fifth time interval, the blue light source 110 is turned on and the red light source 120 is turned off, and after the blue excitation light beam L1 passes through the first part 142 of the first light splitting element 140B, it is sequentially incident to the yellow light conversion region, the yellow-green light conversion region and the reflective region of the wavelength conversion device 130. The yellow light beam and the yellow-green light beam excited by the yellow light conversion region and the yellow-green light conversion region are reflected out of the wavelength conversion device 130 and transmitted to the first light splitting element 140B, and are finally reflected by the first light splitting element 140B and transmitted to the filter device 150. The blue excitation light beam L1 transmitted to the reflective region of the wavelength conversion device 130 is reflected by the reflective region, and is radially transmitted by the focusing lens group 190 to pass through the second part 144 of the first light splitting element 140B. It should be noted that a part of the blue excitation light beam L1 transmitted to the second part 144 is reflected by the second part 144 and transmitted to the diffusion region 156 of the filter device 150. The other part of the blue excitation light beam L1 transmitted to the second part 144 passes through the second part 144, and is reflected by the second light splitting element 170 to sequentially pass through the first part 142 and the diffusion region 156 of the filter device 150. In this way, the light incident to the light valve is avoided to be the unstable mixed color light, thereby improving the usage efficiency of the light valve to increase the projection brightness of the projection device.

Figure 9:
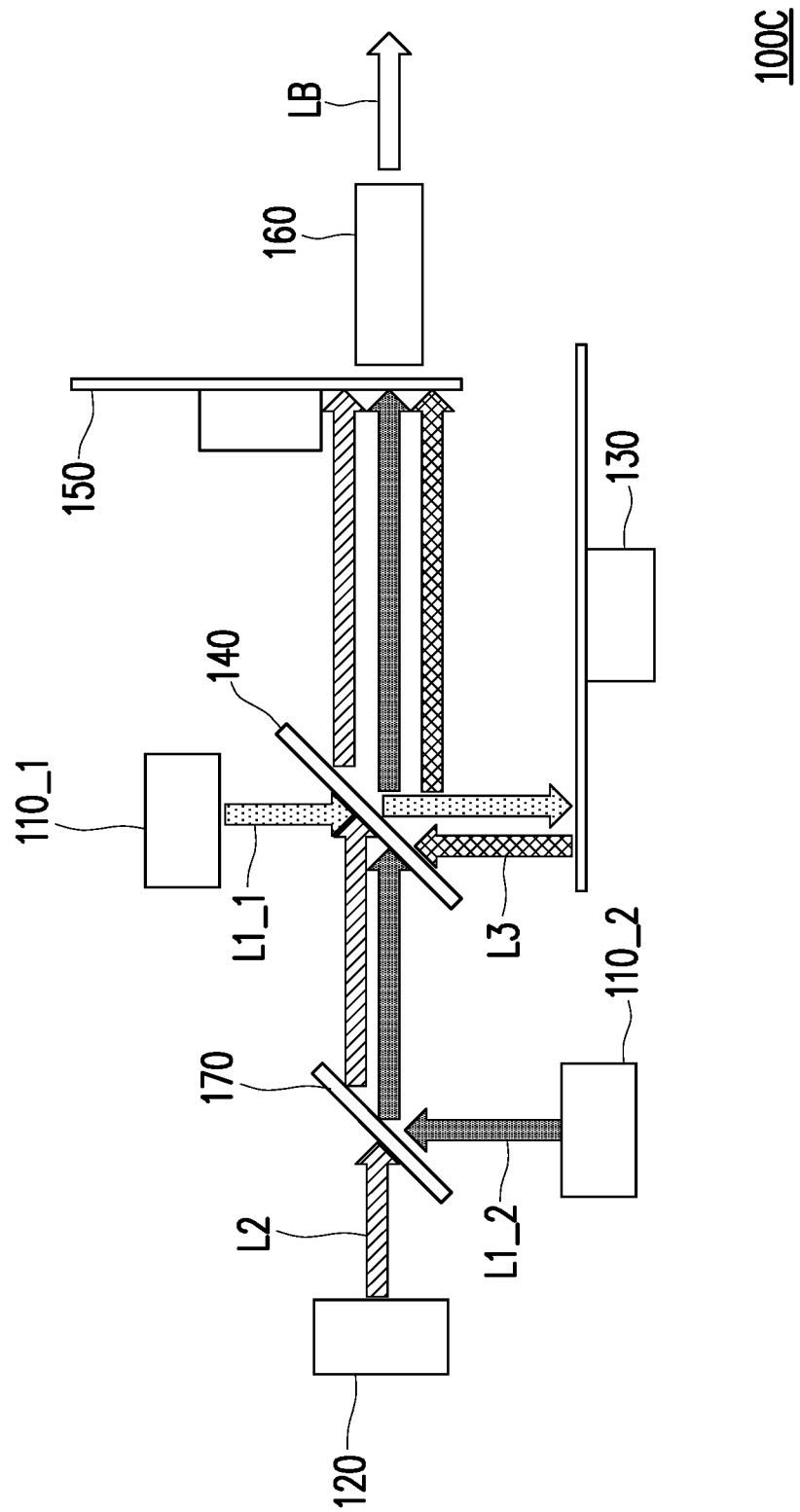
FIG. 9 is a schematic diagram of an illumination system according to another embodiment of the invention.

FIG. 9 is a schematic diagram of an illumination system according to another embodiment of the invention. Referring to FIG. 9, an illumination system 100C of the embodiment is similar to the illumination system 100 shown in FIG. 2. A difference there between is that, in the embodiment, the blue light source 110 includes a first blue light source 110_1 and a second blue light source 110_2. A peak wavelength of a first blue excitation light beam L1_1 emitted by the first blue light source 110_1 is, for example, 455 nm, and a peak wavelength of the second blue excitation light beam L1_2 emitted by the second blue light source 110_2 is, for example, 465 nm. In addition, similar to the illumination system 100B of FIG. 8, the light-transmitting region of the wavelength conversion device 130 of the embodiment is replaced by a reflective region (not shown), but the invention is not limited thereto.

At the first time interval and the third time interval, the first blue light source 110_1 is turned on and the second blue light source 110_2 and the red light source 120 are turned off. The first blue excitation light beam L1_1 penetrates through the first light splitting element 140, and is sequentially incident to the yellow light conversion region and the yellow-green light conversion region of the wavelength conversion device 130. The yellow light beam and the yellow-green light beam excited by the yellow light conversion region and the yellow-green light conversion region are reflected out of the wavelength conversion device 130, and are reflected by the first light splitting element 140 to enter the filter device 150. At the fifth time interval, the second blue light source 110_2 is turned on and the first blue light source 110_1 and the red light source 120 are turned off. The second blue excitation light beam L1_2 is reflected by the second light splitting element 170 to pass through the first light splitting element 140 and the diffusion region 156 of the filter device 150. At the second, fourth, and sixth time intervals, the red light source 120 is turned on and the first blue light source 110_1 and the second blue light source 110_2 are turned off. The red light beam L2 sequentially passes through the second light splitting element 170, the first light splitting element 140, and the filter device 150. In this way, the light incident to the light valve is avoided to be the unstable mixed color light, thereby improving the usage efficiency of the light valve to increase the projection brightness of the projection device.

Figure 10:
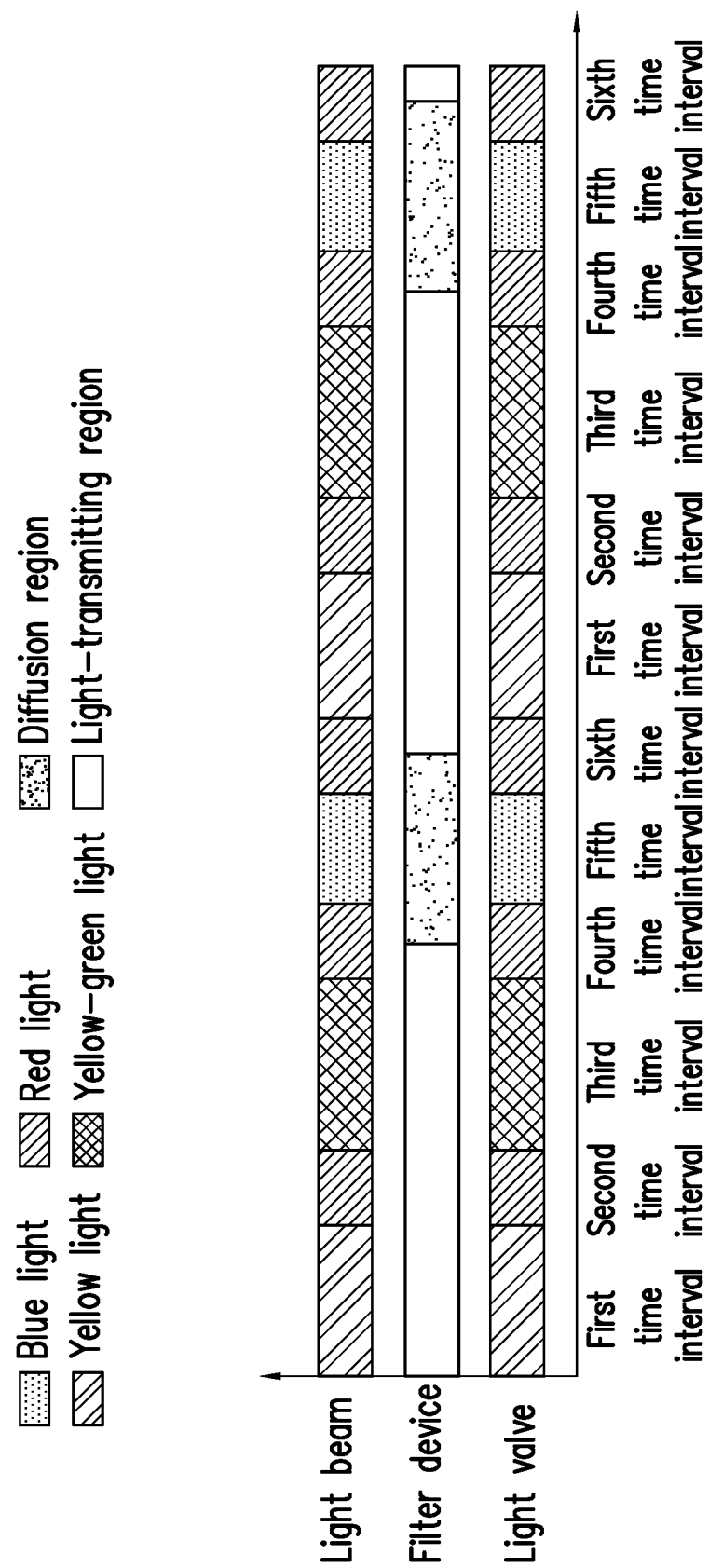
FIG. 10 is a time-interval schematic diagram of an illumination system according to another embodiment of the invention.

FIG. 10 is a time-interval schematic diagram of an illumination system according to another embodiment of the invention. Referring to FIG. 2 and FIG. 10, time intervals of the illumination system of the embodiment is similar to the time intervals of the illumination system shown in FIG. 6, which may be applied to the illumination system 100 of FIG. 2. A difference there between is that, in the embodiment, the filter device 150 may not have the filter region, and the part of the original filter region is designed as a light-transmitting region. In other words, at the third time interval, the excited light beam L3 (the yellow-green light beam) is reflected by the first light splitting element 140 and transmitted to the light-transmitting region of the filter device 150, and is then transmitted into the light uniformizing element 160. In this way, the cost is saved, and effects of improving the usage efficiency of the light valve and increasing the projection brightness of the projection device are simultaneously achieved.

Figure 11:
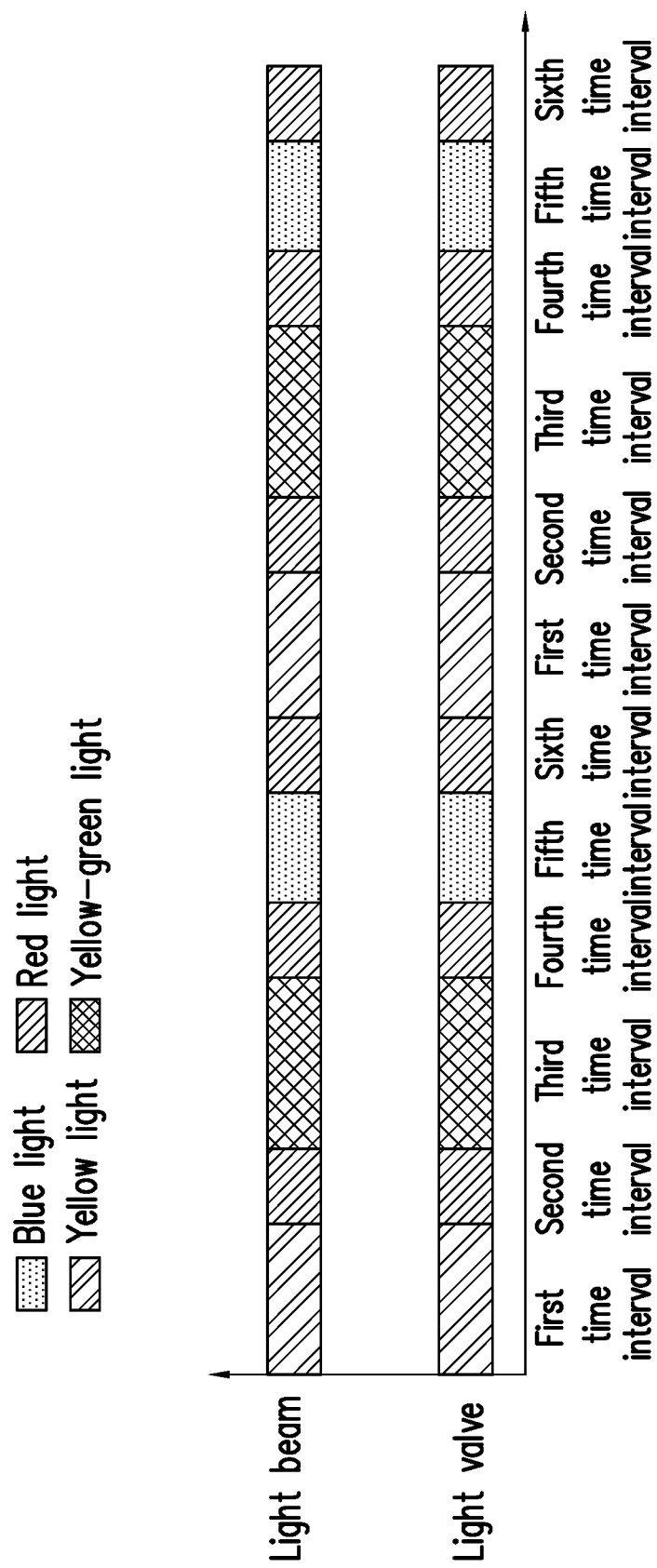
FIG. 11 is a time-interval schematic diagram of an illumination system according to another embodiment of the invention.

FIG. 11 is a time-interval schematic diagram of an illumination system according to another embodiment of the invention. Referring to FIG. 2 and FIG. 11, time intervals of the illumination system of the embodiment is similar to the time intervals of the illumination system shown in FIG. 6, which may be applied to the illumination system 100 of FIG. 2. A difference there between is that, in the embodiment, the filter device 150 may be removed from the illumination system 100, and the diffusion region in the original filter device 150 may be designed on other optical elements in a manner of adhering or coating. In this way, the cost is saved, and the effects of improving the usage efficiency of the light valve and increasing the projection brightness of the projection device are simultaneously achieved.

In summary, the embodiments of the invention have at least one of following advantages or effects. In the illumination system and the projection device of the invention, the blue light source provides the blue excitation light beam, the red light source provides the red light beam, the blue excitation light beam is converted into the excited light beam by the wavelength conversion device, and the red light beam passes through junctions of different regions (such as the light-transmitting region, the filter region and the diffusion region) of the filter device in different time interval. Therefore, a situation that the excited light beam or the blue excitation light beam is transmitted to the junctions of different regions of the filter device to generate unstable mixed color light is avoided. In this way, the light beam entering the light valve is avoided to be unstable mixed-color light, thereby improving the usage efficiency of the light valve to increase the projection brightness of the projection device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, configured to provide an illumination light beam, and comprising a blue light source, a red light source, a wavelength conversion device, a first light splitting element, a filter device, and a light uniformizing element, wherein:
   the blue light source is configured to provide a blue excitation light beam;
   the red light source is configured to provide a red light beam;
   the wavelength conversion device is disposed on a transmission path of the blue excitation light beam for converting the blue excitation light beam into an excited light beam;
   the first light splitting element is disposed on a transmission path of the blue excitation light beam and the excited light beam, and is configured to allow one of the blue excitation light beam and the excited light beam to pass through and reflect the other;
   the filter device is disposed on a transmission path of the red light beam, the blue excitation light beam, and the excited light beam, and comprises a filter region; and
   the filter device is located between the first light splitting element and the light uniformizing element, and the blue excitation light beam, the excited light beam, and the red light beam are transmitted to the filter device, and then enter the light uniformizing element to form the illumination light beam, wherein the excited light beam and the red light beam pass through the filter region in different time interval,
   the filter device comprises a diffusion region adapted to allow the blue excitation light beam and the red light beam to pass through in different time interval.

2. The illumination system as claimed in claim 1, wherein: the filter device comprises a light-transmitting region; the light-transmitting region is configured to allow the excited light beam and the red light beam to pass through in different time interval.

3. The illumination system as claimed in claim 2, wherein: the excited light beam comprises a yellow light beam and a yellow-green light beam; the yellow light beam is transmitted to pass through the light-transmitting region; and the yellow-green light beam is transmitted to pass through the filter region.

4. The illumination system as claimed in claim 1, further comprising:
   a second light splitting element, disposed on the transmission path of the red light beam and the blue excitation light beam, and configured to allow the red light beam to pass through and reflect the blue excitation light beam.

5. The illumination system as claimed in claim 4, wherein the red light beam is transmitted to sequentially pass through the second light splitting element, the first light splitting element, the filter device, and the light uniformizing element.

6. The illumination system as claimed in claim 4, wherein the first light splitting element comprises a first part and a second part, the blue excitation light beam is transmitted to pass through the first part for being transmitted to the wavelength conversion device, and the blue excitation light beam is transmitted by the wavelength conversion device to pass through the second part and is reflected by the second light splitting element to pass through the first part for being transmitted to the filter device.

7. The illumination system as claimed in claim 1, wherein: the illumination system comprises a first time interval, a second time interval, a third time interval, and a fourth time interval; at the first time interval and the third time interval, the blue light source is turned on and the red light source is turned off; and at the second time interval and the fourth time interval, the blue light source is turned off and the red light source is turned on.

8. The illumination system as claimed in claim 7, wherein: one end of the diffusion region and one end of the filter region are adjacent to each other and are provided as a first connection region, and the other end of the diffusion region and the other end of the filter region are adjacent to each other and are provided as a second connection region; at the second time interval, the red light beam passes through the first connection region, and at the fourth time interval, the red light beam passes through the second connection region.

9. An illumination system, configured to provide an illumination light beam, and comprising a blue light source, a red light source, a wavelength conversion device, a first light splitting element, a filter device, and a light uniformizing element, wherein:
   the blue light source is configured to provide a blue excitation light beam;
   the red light source is configured to provide a red light beam;
   the wavelength conversion device is disposed on a transmission path of the blue excitation light beam for converting the blue excitation light beam into an excited light beam;
   the first light splitting element is disposed on a transmission path of the blue excitation light beam and the excited light beam, and is configured to allow one of the blue excitation light beam and the excited light beam to pass through and reflect the other;

the filter device is disposed on a transmission path of the red light beam, the blue excitation light beam, and the excited light beam, and comprises a filter region; and the filter device is located between the first light splitting element and the light uniformizing element, and the blue excitation light beam, the excited light beam, and the red light beam are transmitted to the filter device, and then enter the light uniformizing element to form the illumination light beam, wherein the excited light beam and the red light beam pass through the filter region in different time interval, the illumination system comprises a first time interval, a second time interval, a third time interval, a fourth time interval, a fifth time interval, and a sixth time interval; at the first time interval, the third time interval, and the fifth time interval, the blue light source is turned on and the red light source is turned off; and at the second time interval, the fourth time interval, and the sixth time interval, the blue light source is turned off and the red light source is turned on.

10. A projection device, comprising an illumination system, a light valve, and a projection lens, wherein:
the illumination system is configured to provide an illumination light beam, and the illumination system comprises a blue light source, a red light source, a wavelength conversion device, a first light splitting element, a filter device and a light uniformizing element, wherein:
the blue light source is configured to provide a blue excitation light beam;
the red light source is configured to provide a red light beam;
the wavelength conversion device is disposed on a transmission path of the blue excitation light beam for converting the blue excitation light beam into an excited light beam;
the first light splitting element is disposed on a transmission path of the blue excitation light beam and the excited light beam, and is configured to allow one of the blue excitation light beam and the excited light beam to pass through and reflect the other;
the filter device is disposed on a transmission path of the red light beam, the blue excitation light beam, and the excited light beam, and comprises a filter region; and
the filter device is located between the first light splitting element and the light uniformizing element, and the blue excitation light beam, the excited light beam, and the red light beam are transmitted to the filter device, and then enter light uniformizing element to form the illumination light beam, wherein the excited light beam and the red light beam pass through the filter region in different time interval;
the light valve is disposed on a transmission path of the illumination light beam, and configured to convert the illumination light beam into an image light beam; and
the projection lens is disposed on a transmission path of the image light beam, and configured to project the image light beam from the projection device,
the filter device comprises a diffusion region adapted to allow the blue excitation light beam and the red light beam to pass through in different time interval.

11. The projection device as claimed in claim 10, wherein: the filter device comprises a light-transmitting region; the light-transmitting region is configured to allow the excited light beam and the red light beam to pass through in different time interval.

12. The projection device as claimed in claim 11, wherein: the excited light beam comprises a yellow light beam and a yellow-green light beam; the yellow light beam is transmitted to pass through the light-transmitting region; and the yellow-green light beam is transmitted to pass through the filter region.

13. The projection device as claimed in claim 10, wherein the illumination system further comprises a second light splitting element, disposed on the transmission path of the red light beam and the blue excitation light beam, and configured to allow the red light beam to pass through and reflect the blue excitation light beam.

14. The projection device as claimed in claim 13, wherein the red light beam is transmitted to sequentially pass through the second light splitting element, the first light splitting element, the filter device, and the light uniformizing element.

15. The projection device as claimed in claim 13, wherein the first light splitting element comprises a first part and a second part, the blue excitation light beam is transmitted to pass through the first part for being transmitted to the wavelength conversion device, and the blue excitation light beam is transmitted by the wavelength conversion device to pass through the second part, and is reflected by the second light splitting element to pass through the first part for being transmitted to the filter device.

16. The projection device as claimed in claim 10, wherein: the illumination system comprises a first time interval, a second time interval, a third time interval, and a fourth time interval; at the first time interval and the third time interval, the blue light source is turned on and the red light source is turned off; and at the second time interval and the fourth time interval, the blue light source is turned off and the red light source is turned on.

17. The projection device as claimed in claim 16, wherein: one end of the diffusion region and one end of the filter region are adjacent to each other and are provided as a first connection region, and the other end of the diffusion region and the other end of the filter region are adjacent to each other and are provided as a second connection region; at the second time interval, the red light beam passes through the first connection region, and at the fourth time interval, the red light beam passes through the second connection region.

18. A projection device, comprising an illumination system, a light valve, and a projection lens, wherein:
the illumination system is configured to provide an illumination light beam, and the illumination system comprises a blue light source, a red light source, a wavelength conversion device, a first light splitting element, a filter device and a light uniformizing element, wherein:
the blue light source is configured to provide a blue excitation light beam;
the red light source is configured to provide a red light beam;
the wavelength conversion device is disposed on a transmission path of the blue excitation light beam for converting the blue excitation light beam into an excited light beam;
the first light splitting element is disposed on a transmission path of the blue excitation light beam and the excited light beam, and is configured to allow one of the blue excitation light beam and the excited light beam to pass through and reflect the other;

the filter device is disposed on a transmission path of the red light beam, the blue excitation light beam, and the excited light beam, and comprises a filter region; and the filter device is located between the first light splitting element and the light uniformizing element, and the blue excitation light beam, the excited light beam, and the red light beam are transmitted to the filter device, and then enter the light uniformizing element to form the illumination light beam, wherein the excited light beam and the red light beam pass through the filter region in different time interval;

the light valve is disposed on a transmission path of the illumination light beam, and configured to convert the illumination light beam into an image light beam; and the projection lens is disposed on a transmission path of the image light beam, and configured to project the image light beam from the projection device, the illumination system comprises a first time interval, a second time interval, a third time interval, a fourth time interval, a fifth time interval, and a sixth time interval; at the first time interval, the third time interval, and the fifth time interval, the blue light source is turned on and the red light source is turned off; and at the second time interval, the fourth time interval, and the sixth time interval, the blue light source is turned off and the red light source is turned on.

* * * * *